United States Patent
Lavi et al.

(10) Patent No.: US 10,820,732 B2
(45) Date of Patent: *Nov. 3, 2020

(54) CONSUMPTION MANAGEMENT BEVERAGE APPARATUS AND STORAGE VESSEL

(71) Applicant: FITTO LTD., Tel Aviv (IL)

(72) Inventors: Yaniv Lavi, Tel Aviv (IL); Liran Golan, Haifa (IL)

(73) Assignee: FITTO LTD, Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,705

(22) Filed: Jan. 27, 2020

(65) Prior Publication Data

US 2020/0154920 A1    May 21, 2020

Related U.S. Application Data

(63) Continuation of application No. 15/512,859, filed as application No. PCT/IL2015/050963 on Sep. 21, 2015, now Pat. No. 10,568,448.

(Continued)

(51) Int. Cl.
*A47G 23/16* (2006.01)
*H04Q 9/00* (2006.01)
(Continued)

(52) U.S. Cl.
CPC ......... *A47G 23/16* (2013.01); *A47G 19/2227* (2013.01); *B65D 85/72* (2013.01);
(Continued)

(58) Field of Classification Search
None
See application file for complete search history.

(56) References Cited

U.S. PATENT DOCUMENTS 9,695,030 B2 *   7/2017   Walker ................. B67D 3/0012
10,046,904 B2 *  8/2018   Evans .................... B65D 77/04
(Continued)

OTHER PUBLICATIONS

Office Action dated Dec. 7, 2018 for corresponding U.S. Appl. No. 15/512,859.

(Continued)

*Primary Examiner* — Chico A Foxx
(74) *Attorney, Agent, or Firm* — Pearl Cohen Zedek Latzer Baratz LLP (57) ABSTRACT

A smart beverage apparatus for monitoring consumption is disclosed, comprising a vessel receiving port for receiving a supplement vessel, said supplement vessel stores one or more supplements, and a scanning unit for scanning a vessel data storage unit to obtain supplement data related to supplements contained in the supplement vessel. The beverage apparatus comprises a display unit to display data to a user. A method for monitoring consumption of a user using a smart beverage apparatus is also disclosed, the method comprising: receiving an indication that a supplement vessel has been inserted into the smart beverage apparatus scanning a vessel data storage unit to obtain supplement data related to supplements stored within the supplement vessel, analyzing the obtained supplement data, generating instructions for the user based on the analysis, and displaying the generated instructions to the user.

11 Claims, 7 Drawing Sheets

Related U.S. Application Data (60) Provisional application No. 62/053,158, filed on Sep. 21, 2014.

(51) Int. Cl.
*G08B 5/22* (2006.01)
*B65D 85/72* (2006.01)
*A47G 19/22* (2006.01)
*G06Q 10/08* (2012.01)

(52) U.S. Cl.
CPC ............ *G06Q 10/087* (2013.01); *G08B 5/22* (2013.01); *H04Q 9/00* (2013.01); *B65D 2203/10* (2013.01); *B65D 2203/12* (2013.01); *G06Q 10/08* (2013.01); *H04Q 2209/40* (2013.01)

(56) References Cited

U.S. PATENT DOCUMENTS

| | | |
|---|---|---|
| 2006/0241355 A1 | 10/2006 | Howell et al. |
| 2009/0004343 A1 | 1/2009 | Xiong et al. |
| 2009/0115598 A1* | 5/2009 | Carlson, Jr. .......... A61J 7/0472 340/526 |
| 2010/0018220 A1 | 1/2010 | Modad |
| 2010/0039252 A1* | 2/2010 | Barkus .................. A61J 7/0472 340/521 |
| 2011/0047108 A1 | 2/2011 | Chakrabarty et al. |
| 2011/0050431 A1 | 3/2011 | Hood et al. |
| 2011/0163119 A1* | 7/2011 | Nyambi ............... B65D 47/243 222/1 |
| 2012/0103926 A1 | 5/2012 | Ibsies |
| 2012/0183657 A1 | 7/2012 | Marina et al. |
| 2012/0259180 A1* | 10/2012 | Rock ........................ B62J 9/22 600/300 |
| 2012/0285986 A1 | 11/2012 | Irvin |
| 2012/0298532 A1 | 11/2012 | Woolf et al. |
| 2012/0299723 A1 | 11/2012 | Hafezi-Hooman et al. |
| 2013/0002108 A1 | 1/2013 | Girard et al. |
| 2014/0046596 A1* | 2/2014 | Chang ................ G06F 19/3475 702/3 |
| 2015/0223632 A1 | 8/2015 | Hall |
| 2016/0207754 A1 | 7/2016 | Grottini |
| 2016/0242455 A1 | 8/2016 | Evans et al. |
| 2017/0156540 A1* | 6/2017 | Wheatley ............. B67D 1/0019 |
| 2018/0177325 A1 | 6/2018 | Lyons et al. |
| 2019/0139445 A1* | 5/2019 | Reddy ................... G16H 40/63 |

OTHER PUBLICATIONS

Office Action dated May 9, 2019 for corresponding U.S. Appl. No. 15/512,859.

Notice of Allowance dated Oct. 17, 2019 for corresponding U.S. Appl. No. 15/512,859.

* cited by examiner

CONSUMPTION MANAGEMENT BEVERAGE APPARATUS AND STORAGE VESSEL

CROSS-REFERENCE TO RELATED APPLICATIONS

This application is a Continuation of U.S. application Ser. No. 15/512,859, filed Mar. 21, 2017, which is a U.S. National Phase Application of PCT International Application No. PCT/IL2015/050963, filed Sep. 21, 2015, which claims the benefit of U.S. Provisional Application No. 62/053,158, filed on Sep. 21, 2014, all of which are hereby incorporated by reference.

FIELD OF THE INVENTION

The subject matter relates generally to a smart beverage apparatus that monitors a user's consumption, and a storage vessel for preparing supplement beverages for consumption such as dietary supplements, sport supplements, functional food, and the like.

BACKGROUND OF THE INVENTION

Increase in life expectancy and subsequent increase in nutritional deficiencies have created an increased interest in nutritional supplements. Growing awareness for better nutrition and a need for a healthy lifestyle results in a demand for accurate consumption of food supplements such as proteins, vitamins, minerals, fatty acids, probiotics, and the like. Furthermore, consuming the correct quantity of the supplements may have health implications as well. Consuming an insufficient quantity of the supplements may not provide the expected benefit, while taking an excessive quantity may have detrimental effects on the consumer taking the supplements. In some cases, the consumer does not know which supplements will be beneficial and thus may take supplements that provide no benefit or may even cause harm to the consumer.

Consumers are increasingly demanding healthy and convenient lifestyle solutions, thus making dietary and sports supplements a preferred options to meets this need. Largest markets for dietary supplements include Asia Pacific, North America and Europe. For example, about 50% of Americans use dietary supplements on a regular basis to improve their health. About 22% of Americans engage in physical activities of 60 minutes a day, and repeatedly consume sports drinks and supplements. The average yearly amount spent on herbs, vitamins, minerals, amino acids, and other pills (purchased without a physicians prescription) is 35 billion dollars. Nevertheless, recent research shows that customization and personalization is the need of the hour for nutraceuticals, specifically in developed markets such as US and Europe. Moreover consumers are seeking more variety and benefits from delivery methods beyond those possible through traditional tablet and pills technologies.

In addition, there are significant disparities when it comes to consumption and user experience in the dietary and sport supplements industry. Consumption management is one challenging arena. Disparities in user experience may, in some cases, be related to lack of knowledge of how the human body functions, and what are its ongoing nutritional diverse needs to support optimized health and body performance Mastering such complex knowledge and understanding may require years of study. When a consumer decides to base his/her consumption on scientific data, the user will typically encounter an excess amount of data which may be incoherent or difficult to understand, and many different approaches to what an optimal consumption includes.

In another arena, dietary and sport supplements may be consumed in various forms, for example, capsules, pills, powders, gel caps and tablets among others. There are inherent difficulties associated with these consumption methods. For example, storage and handling of dietary supplements is challenging. Dietary and sport supplements are usually packaged in boxes of 60-120 servings, or provided in very large and inconvenient whey protein cans. Some supplements contain multi-vitamins and multiple ingredients, but most supplements contain a single ingredient. These large packages may cause a user to store stacks of supplements boxes, which may eventually end up not being used, or expired. In another example, users improvise methods to pack along a single serving of supplements such as whey protein powder to location of their physical workout, e.g. using small plastic bags. This phenomenon also leads to inaccurate consumption of supplements. Furthermore, when powder chunks are not perfectly dissolved in water, an unpleasant drinking experience may be caused.

Some consumers have wallowing difficulties—research shows that 40% of the Americans have difficulty to swallow pills. In addition, pills or tablets that compose many ingredients tend to be too big to be swallowed smoothly.

Another challenge is related to after taste. Multiple times after consuming dietary supplements, one may suffer from an after-taste of flavors, for example if the outer coating of a pill or tablet has dissolved before reaching the small bowel.

Different approaches exist for consumption of dietary and nutritional supplements, and a consumer may find it difficult to determine the optimal consumption plan. Some users may be unaware of bodily functions ongoing nutritional needs that are required to support an optimized healthy body performance Supplements are prepared for consumption in a plurality of preparation methods. One of the methods includes mixing supplements with a liquid or beverage and drinking the supplements that dissolve into the beverage. The supplements may be provided in a powder form, a liquid form, a powder and liquid combination form or other forms. Most supplements that are mixed with beverages to enable consumption are provided in large quantities with a scoop. The consumer adds the supplements into the beverage, mixes and drinks the mixture. Use of the scoop by the consumer to add the supplements into the beverages may cause inexperienced consumers to mix too much supplements or too little supplements with the beverages, thus causing the supplement consumption experience to be lacking. It is difficult to maintain an accurate log of the amount of supplements consumed, leading to incorrect amounts of supplements at inappropriate times that may be consumed.

Dissolving of supplements in the beverage requires excessive mixing and shaking to ensure optimal dissolving of the supplements in the beverage. Some supplements, especially when added at an incorrect amount to a beverage, require constant shaking and mixing during the consumption of the beverage. Such a need to continuously shake and mix may result in spillage and loss of supplements and beverage when the container is not properly covered or closed, or when the container does not comprise a cover.

Some supplements are consumed by swallowing the whole supplement, for example pills or capsules. The swallowing of the supplements may prove difficult, for example for small children and/or elderly individuals. Some solutions exist, such as chewable supplements, e.g. chewable vitamin candies. However, consuming these still requires certain motor skills that could impede consumption of the supplement due to age or physical disabilities. Consumption of supplements by swallowing may require the consumer to take excessive or insufficient amounts of the supplement, which may cause the consumer unwanted side effects of the consumption. Monitoring the amount of supplements a consumer is required to consume for optimal nutrition may be difficult or inaccurate when consuming by swallowing the supplements.

Consumption of high nutritional value formulations of dietary and/or sport supplement in the form of beverage, provides an advantageous combination of taste, convenience and health. It would be advantageous to provide a method and system that allow simple monitoring of a user's supplement consumption.

SUMMARY OF THE INVENTION

The subject matter discloses a smart beverage apparatus for monitoring consumption, comprising a vessel receiving port for receiving a supplement vessel, said supplement vessel stores one or more supplements such as dietary supplements, sports supplements, etc.

The smart beverage apparatus comprises a scanning unit for scanning a vessel data storage unit of a supplement vessel, to obtain supplement data related to supplements contained in the supplement vessel. For example, the data obtained by the scanning unit may include various parameters, such as ingredients of the supplement contained in the vessel, the expiry date of the contents of the supplement vessel, instructions or notifications related to one or more preferred consumption manners of a beverage prepared using the supplement vessel, encrypted data for verification of the supplements vessel's authenticity, preferred consumption data and consumption plan may be incorporated in a vessel data storage unit of the supplement vessel. When inserted to the beverage apparatus, which may be synchronized with data stored in a remote device, the beverage apparatus may provide a user with consumption instructions and indications. For example, user profile data may be cross-referenced or compared with data stored in the vessel data storage unit, and a consumption plan that is stored and related to the specific vessel may be provided.

In some embodiments, the smart beverage apparatus comprises a display unit to display data related to consumption to a user. For example, the display unit may display notifications and reminders related to a user's consumption plan, the recommendations may include recommended time windows to consume supporting nutrition that may improve efficiency, absorption and bioavailability of the consumed supplement.

In some embodiments, the smart beverage apparatus comprises a transceiver for transmitting data related to consumption to a remote device. For example, an indication of a supplement vessel insertion into the smart beverage apparatus may be obtained by the scanning unit, and may be transmitted to a remote device, along with data relating to the insertion date and time, a unique identifier of the beverage apparatus, an identifier of the user associated with the specific beverage apparatus, etc.

In some embodiments, the supplement data may be transmitted wirelessly to a remote device for example, by using two-way communication channels in order to deliver data to a mobile phone, a smartphone, a tablet, a computerized device, a server, etc.

In some embodiments, the smart beverage apparatus comprises a power source to supply power to electrical components of the beverage apparatus. The power source may be a rechargeable power source.

The subject matter further discloses a supplement vessel for storing a consumable supplement such as a dietary or nutritive supplement. The supplement vessel may comprise a vessel data storage unit for storing data related to the contents of the supplement vessel. The supplement vessel comprises a vessel for storing the supplement contents.

In some embodiments, the vessel data storage unit stores at least one parameter selected from: a name, an identification code, an expiry date, ingredients of the supplement, indications or instructions related to consumption manner of the supplements contained in the supplement vessel, or combination thereof.

In some embodiments, the smart beverage apparatus may be configured to monitor consumption of a user. In some embodiments, the smart beverage apparatus may be configured to receive an indication that a supplement vessel has been inserted into the smart beverage apparatus.

The subject matter further discloses a method for monitoring consumption of a user using a smart beverage apparatus. The method may include receiving an indication that a supplement vessel has been inserted into the smart beverage apparatus. The method may include scanning a vessel data storage unit to obtain data related to supplements stored within the supplement vessel, and analyzing the obtained supplement data and additional data such as instruction and consumption plan related to the vessel contents. Instructions or recommendations for the user may be generated based on the analysis. The generated instructions may be displayed to the user, for example on the display unit of the smart beverage apparatus.

In some embodiments, the method may include determining whether the obtained supplement data satisfies at least one predetermined condition, and enabling or disabling discharge of supplement vessel contents into a tank of the smart beverage apparatus accordingly. In some embodiments, the method may include determining to reject the supplement vessel. In some embodiments, the method may include displaying obtained supplement data to the user.

Data may be transmitted from the smart beverage apparatus to a remote device, and indications related to the transmitted data may be received from the remote device. For example, the smart beverage apparatus may transmit a timestamp of the insertion of the supplement vessel, the type of supplement or ingredients thereof, scanned supplement data from the supplement vessel, the results of the determination operation whether the scanned data of vessel data storage unit satisfies at least one predetermined condition, a unique identifier or ID code of the smart beverage apparatus, sensed data from the spout sensor, a manner of consumption, time of consumption, duration of consumption, a user's name or identifier, etc.

In some embodiments, the smart beverage apparatus may be configured to analyze the obtained supplement data. For example, the analysis may include verifying whether the scanned data of the supplement vessel satisfies at least one predetermined condition. In one example, the analysis may include determining whether the ingredients of the supplement vessel, matches the user's health needs based on the user profile data. In another example, the analysis may include receiving data related to a user's blood tests, and determining whether the supplement contents are safe or recommended for the user.

In some embodiments, the smart beverage apparatus may be configured to generate instructions to a user based on the analysis. For example, if it is determined during the analysis that a user's blood test results indicate that a user should refrain from consuming certain supplements, a corresponding indication to the user may be generated.

In some embodiments, the smart beverage apparatus may be configured to display the generated instructions to the user. For example, the display unit may indicate to the user that the supplement vessel was inserted, e.g. by displaying a visual and/or audible notification such as: "SUPPLEMENT VESSEL INSERTED".

In some embodiments, the smart beverage apparatus may be configured to determine whether the obtained supplement data satisfies at least one predetermined condition. For example, a predetermined condition may include determining whether the inserted vessel contains a specific ingredient or food which is harmful to the user due to an allergy or sensitivity, for example as indicated in the user profile data.

In some embodiments, the smart beverage apparatus may be configured to enable discharge of supplement vessel contents into a tank of the smart beverage apparatus. For example, the discharge of supplement vessel contents may be performed by rotational energy, stimulus pressure, puncturing needles etc.

In some embodiments, the smart beverage apparatus is further configured to receive from the remote device indications and/or instructions related to the transmitted data. For example, the indications may include nutrition user instructions based on online reference, a user's lifestyle and physical wellness, a user's sports activity schedule, a user's health status based on data obtained from a user's healthcare program.

In some embodiments, the smart beverage apparatus is further configured to provide the received indications to the user via the smart beverage apparatus or via the remote device. For example, an instruction may be provided by a remote device and/or by a processor of the smart beverage apparatus to prohibit preparation of the beverage.

BRIEF DESCRIPTION OF THE DRAWINGS

The subject matter relates to a smart beverage apparatus for preparing supplements for consumption, according to exemplary embodiments.

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION

The subject matter relates generally to the smart beverage apparatus for preparing and consuming supplements, and to monitoring the consumption of supplements, according to exemplary embodiments.

Figure 1:
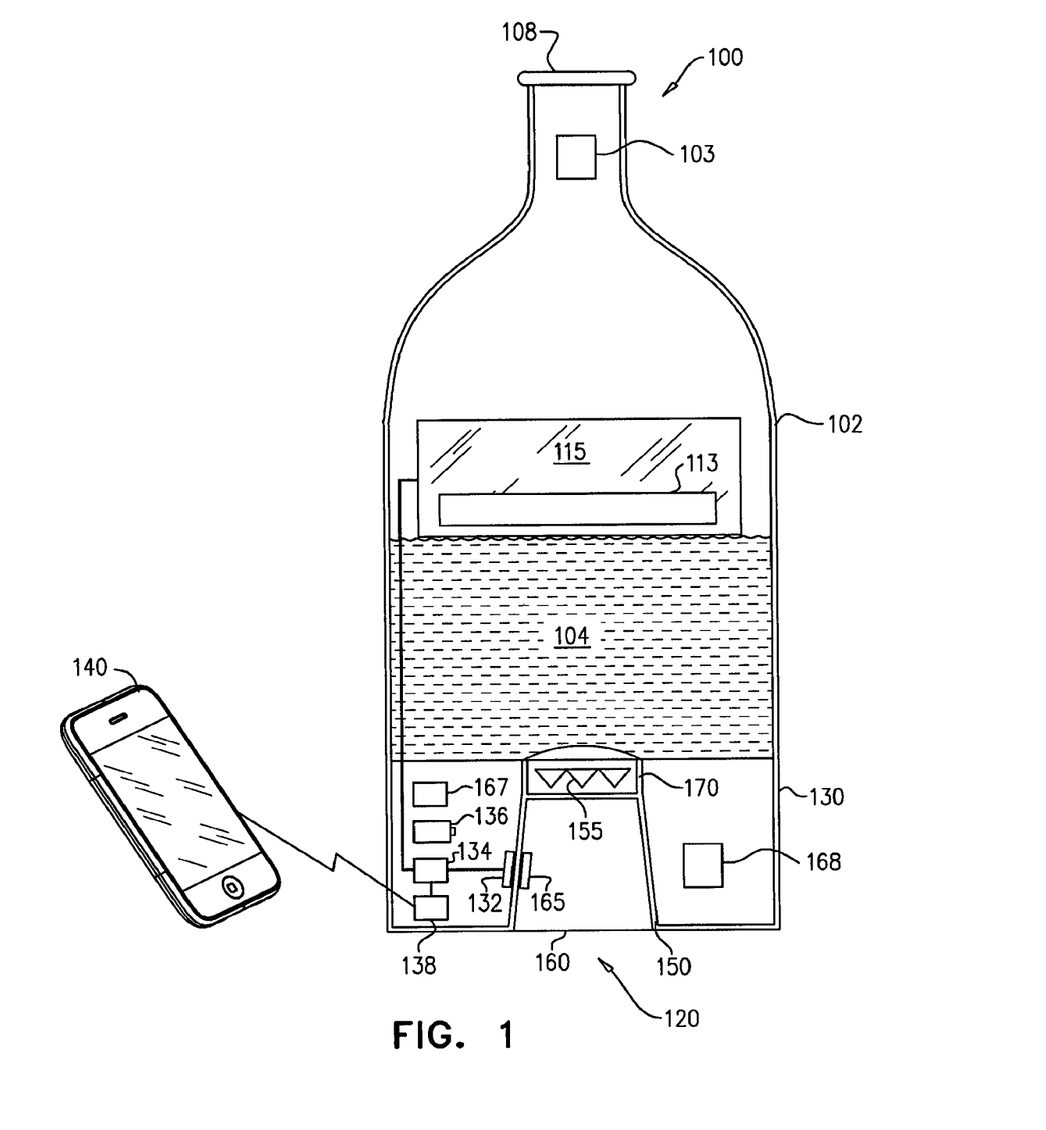
FIG. 1 shows a schematic illustration of the smart beverage apparatus, according to some exemplary embodiments of the subject matter.

FIG. 1 shows a schematic illustration of the smart beverage apparatus 100, according to some exemplary embodiments of the subject matter. The smart beverage apparatus 100 comprises a tank 102 which is filled with a liquid or beverage 104. The beverage 104 may be for example, water, milk, soda, juice, or the like.

The tank 102 comprises a port or spout 108, which enables inserting the beverage 104 into the tank 102 or pouring the beverage 104 out of the tank 102. The port or spout 108 may be covered with a removable lid. The smart beverage apparatus 100 comprises a beverage apparatus receiving unit 130. The beverage apparatus receiving unit 130 is connected to a portion 120 of the smart beverage apparatus 100, for example a bottom portion, a top portion, or a side portion. The beverage apparatus receiving unit 130 is configured to receive a supplement vessel 160 for mixing the contents of the supplement vessel 160 with the liquid in the tank 102 to obtain a beverage 104 that contains the dissolved supplement contents. It should be noted, that the beverage 104 may be poured and stored in the tank 102 prior to inserting the supplement vessel 160 into the beverage apparatus receiving unit 130.

The supplement vessel 160 comprises a predetermined quantity of one or more supplements for consumption after dissolving into the beverage 104, for example, the supplement vessel 160 stores a single serving of supplements, formulation of supplements etc. The supplements may be provided in a powder form, a liquid form, a powder and liquid combination or other forms. The beverage apparatus receiving unit 130 comprises a supplement vessel port 150, which may receive a supplement vessel 160 in a vessel container. The supplement vessel 160 contains supplements that are added to, mixed with or dissolved into the beverage 104 to enhance the beverage 104 that is consumed by a user of the smart beverage apparatus 100. For example, the supplements may comprise vitamins, proteins, minerals, antioxidants, probiotics, herbal, botanical amino acids, fruit extracts or the like.

In some cases, the supplements may be a meal replacement comprising essential nutrients, carbohydrates, proteins and fats, a person requires in a meal. The supplement vessel 160 is locked in place after being inserted into the supplement vessel port 150.

The beverage apparatus receiving unit 130 comprises a discharge mechanism 155, e.g. rotational energy, stimulus pressure, puncturing needles etc.

In one embodiment, the discharge mechanism may open or puncture the supplement vessel 160 with various mechanism to cause release of the vessel contents into the tank 102.

In one embodiment, the discharge mechanism 155 may comprise one or more puncturing needles that puncture the supplement vessel 160, e.g., upon insertion of the supplement vessel 160 into the beverage apparatus receiving unit 130. For example, supplement vessel 160 may be inserted into the beverage apparatus receiving unit 130 by applying a twisting motion, a push motion, or the like. The insertion causes the supplement vessel 160 to move towards the discharge mechanism 155 causing the one or more discharge mechanism 155 to release or discharge the contents of the supplement vessel 160 into the tank 102. The discharge mechanism 155 may include one or more openings through which supplements to reach the beverage 104.

In some cases, the discharge mechanism 155 puncture a supplement vessel seal (not shown), which is composed of a material that is easier to puncture than other walls of the supplement vessel 160, e.g. aluminum foil or a puncturable plastic film. As the one or more discharge mechanism 155 create openings in the supplement vessel 160, the supplements in the supplement vessel 160 are mixed with the beverage 104 through a tube 170.

In some non-limiting embodiments, one or more supplement vessels may be inserted consecutively into the beverage apparatus receiving unit 130, to provide the user of the smart beverage apparatus 100 with more than one type of supplement, or with a larger quantity of a desired supplement.

In some embodiments of the subject matter, the smart beverage apparatus 100 may comprise a spout sensor 103, which may be located on or near the spout 108. The spout sensor 103 may be located within the smart beverage apparatus 100 and may use one or more sensors, e.g. temperature sensors, contact sensors in order to determine or verify that a user actually consumed the beverage, rather than spill it or discard it, for example. The verification may be performed using, e.g. body temperature, contact or touch indicators, and/or a flow meter. The time duration during which a user's mouth contacted the spout 108 and/or the amount consumption by the user may be measured and stored for later use.

In some non-limiting embodiments of the subject matter, the supplement vessel 160 is sealed with vacuum or with a pressure differential, which is different from pressure in the tank 102. When the supplement vessel seal is punctured, the pressure differential causes supplements in the supplement vessel 160 to be pushed at a force into the tank 102 to mix with the beverage 104. In other non-limiting cases, the puncturing of the supplement vessel 160 causes the beverage 104 to flow into the supplement vessel 160 at a force that causes the supplements to mix with the beverage 104. In some non-limiting embodiments, the pressure differential and release of the supplements may cause a cooling reaction to the beverage 104 in the tank 102.

The beverage apparatus receiving unit 130 comprises a scanning unit 132, which obtains supplement data from a vessel data storage unit 165. The vessel data storage unit 165 is connected to or embedded into the supplement vessel 160 in a manner that enables the scanning unit 132 to scan the vessel data storage unit 165 when the supplement vessel 160 is inserted into the supplement vessel port 150.

In some embodiments, the supplement vessel 160 may comprise a unique code or encrypted data, e.g. stored in vessel data storage unit 165, which may be validated by the processor 134 in order to prevent insertion of forged or unknown vessels into the beverage apparatus receiving unit 130. The encrypted data may be scanned by the scanning unit 132 upon insertion of the supplement vessel 160 into the supplement vessel port 150.

In some embodiments, the vessel data storage unit 165 may store supplement data related to the supplement contents. Supplement data may include various parameters, such as: ingredients of the supplement vessel 160, the expiry date of the contents of a supplement vessel 160, instructions or notifications related to preferred consumption manner of the beverage prepared using the supplement vessel 160, encrypted data for verification, etc. Various types of supplement vessels 160 may include varying combinations of ingredients and/or flavors to match a user's optimal consumption and preferences.

The supplement data may include nutritional information of the supplements contained in the supplement vessel 160, for example, the quantity and type of vitamins in the supplements, amount of calories, amount of proteins, amount of carbohydrates, amount of fats, etc. According to exemplary embodiments, the vessel data storage unit 165 may be a memory unit or storage unit, e.g. a flash memory device or a Radio-frequency identification (RFID) tag for wirelessly transferring data via electromagnetic fields. In some embodiments, the vessel data storage unit 165 may be implemented utilizing nano-scale pad printing techniques.

In some embodiment, the supplement data stored in data chip 165 may include consumption time window data. For example, one or more time windows that indicate optimal consumption time, one or more time windows that indicate prohibited consumption time, one or more time windows that indicate recommended consumption time, etc.

Optimal consumption time window data for may include e.g. an advisable periodic schedule for consumption of one or more supplements for improvement of sport activity recovery. The optimal consumption time window data may indicate or suggest e.g. one or more optimal time periods or time windows for consumption of the beverage mixed with supplements. For example, optimal time window data for consumption of the supplement may indicate how much time before, after and/or during the sport activity, the one or more supplements should be consumed. In another example, optimal time window data may indicate one or more time intervals recommended between each consumption of supplement, e.g. by dividing the supplement consumption into a plurality of separate, intermittent consumption sessions, each session including consumption of a partial amount of beverage mixed with the supplement. Optimal consumption time window data may indicate that two or more consumption sessions are advised, with intervals of, e.g. 10 minutes, an hour, two hours, etc. In yet another example, optimal time window data may indicate when to update a user's consumption plan, e.g. if a user feels suddenly overly weak and may need an immediate update in the consumption plan.

Time windows that indicate prohibited consumption time for may include, e.g., one or more time windows, time periods, or time durations required between eating and supplement consumption. For example, if a user consumed dairy products in a previous meal, consumption of an iron supplement may be ineffective during a limited time period after the dairy meal. An appropriate indication may be generated, advising the user of the time interval for waiting before consuming the supplement. In another example, consumption of a supplement or ingredient may be prohibited due to a temporary illness, an appropriate indication may be generated, e.g., if a user suffers of high fever and the consumption is prohibited during high fever. In another example, information specifying time windows for a user suffering from a chronic disease may be indicated in the prohibited consumption time data, e.g. if a user suffers from diabetes, the time windows may include detailed instructions referring to the periods the user should avoid consumption of the supplement or delay of consumption of the supplement, e.g. if the user's blood sugar indication is too high or too low.

Recommended consumption time windows may include indications how a user may improve the effectiveness of the consumed supplement. For example, if consumption of vitamin C improves the absorption of the consumed supplement, or if consumption of a supplement along with a meal may prevent digestion discomfort.

The scanning unit 132 scans the vessel data storage unit 165 when the supplement vessel 160 is inserted and/or locked into the supplement vessel port 150. The scanning unit 132 provides the supplement data to a beverage apparatus storage unit 168 and/or to processor 134 which may be operationally connected to the scanning unit 132.

The beverage apparatus storage unit 168 may store additional data related to monitoring consumption of a user of a beverage apparatus 100, e.g. profile data of a specific user, usage data, and/or apparatus-related information.

User profile data may characterize the user and indicate a user's capabilities, health status, special needs, preferences, and/or schedule of activities. The user profile data may include data that relates to a user, e.g. a user's consumption habits or preferences, recommended supplements and nutrition plan, daily schedule or workout plan, a user's age, weight, data related to the type or category of a user, (e.g. a professional sports category or an amateur sports category), a military user with specific nutrition needs, a child and/or a person with special needs.

In one embodiment, user profile data may include usage data such as a user's supplement consumption history, expected future supplement/s required e.g. for the near day or for another time period (e.g. the coming week and/or for the coming month).

User profile data may be obtained from the user, e.g. by a personal questionnaire which may be filled by the user or a healthcare advisor. The questionnaire may include data related to the user's lifestyle, physical fitness, sports activities, medications (including prescription medications or non-prescription medication), nutrition, special health needs, family history, etc. The questionnaire may optionally include lab test results or health test results of the user.

In one embodiment, the user profile data may be obtained and synchronized to and/or from external products and database. For example, if the user suffers from diabetes the most updated information regarding diabetes may be uploaded and synchronized to the user profile data, e.g. the consumption recommendations may be updated accordingly. In another embodiment the user profile data may be cross-referenced with updated evidence-based research data using online databases, or external databases (for example external database 535 of FIG. 2B). In yet another embodiment, the user profile data may be cross-referenced with internal databases and internal research which may be constantly updated.

The apparatus-related information may include identifier or identification code or serial number of smart beverage apparatus 100, size or volume smart beverage apparatus 100, type of vessels that are acceptable for inserting into the smart beverage apparatus 100, the maximum quantity the smart beverage apparatus 100 may contain, maximum temperature of a beverage that smart beverage apparatus 100 may hold, a model of smart beverage apparatus 100, recommended time for replacement of smart beverage apparatus 100, etc.

The beverage apparatus storage unit 168 may store data related to a user's consumption plan which may include e.g. supplement data, usage data, sensed data, apparatus-related data, instruction data, user profile data, etc. The stored data may be used and analyzed (e.g. by a remote server) in order to provide a personalized consumption plan for a user, and supply personalized user instructions, indications and information generated for the user.

The consumption plan may include time-related data for consumption of one or more supplements, for example when to consume a supplement vessel 160 of a certain type or containing certain ingredients, how long before or after a sports activity the supplement vessel 160 should be consumed, when was the last consumption, when is the next consumption expected, time of final consumption (for example if the consumption is limited in time because of a specified health instructions), what is the recommended consumption manner, etc.

The consumption plan may include amount-related data, such as minimal, maximal or optimal consumption amount of a certain supplement for a predefined time period. The consumption plan may include type of supplements and/or recommended ingredients, appropriate supplement vessels containing the recommended ingredients, etc.

The consumption plan may include specific user instructions which are personalized according to the user profile data. For example, when the supplement vessel 160 contains iron, the consumption plan may indicate that the user should refrain from consumption of dairy products for two hours after the supplement vessel 160 consumption, in order to optimize absorption of the iron additive in the user's body.

The processor 134 may cause display unit 115 (for example an LED screen) to display some or all of the scanned supplement data. In some embodiments, the display unit 115 may include a user input unit 113, e.g. a touch screen, in order to enable the user to input information into the smart beverage apparatus 100. For example, when the display unit 115 displays a question to the user which requires a response, the user input unit 113 may enable input by e.g. touching or typing the required information.

In some embodiments, the display unit 115 of the smart beverage apparatus 100 and/or a remote device 140 may display notifications and reminders related to the consumption plan, recommending time windows to intake supporting nutrition that may improve efficiency, absorption and bioavailability of the consumed supplement. In another example, notifications and reminders for consumption may include time periods for avoiding consumption of specific foods or supplements that may harm or may impede absorption of certain supplements or foods.

The display unit 115 may be connected to the tank 102 or is part of the tank 102, and displays the information such that the user of the smart beverage apparatus 100 may view the supplement data before, during or after consuming the beverage mixed with the supplements.

In some embodiments the beverage apparatus storage unit 168 may store data transmitted from the vessel data storage unit 165 (e.g. supplement data) or any data received from a remote device 140 (e.g., usage data, user profile data, etc.), and/or apparatus-related data such as a beverage apparatus identification code or serial number.

In some embodiments, the beverage apparatus storage unit 168 may include additional data, for example the current time and date of insertion into the beverage apparatus receiving unit 130, a maximum volume of beverage which the smart beverage apparatus 100 may contain, details of the user's last usage of the beverage apparatus 100 etc.

In some exemplary embodiments of the subject matter, the beverage apparatus receiving unit 130 comprises a transceiver 138, e.g. a wireless transceiver. The transceiver 138 transmits the supplement data to the remote device 140, for example to a mobile phone, a smartphone, a tablet, a computerized device, a server, etc. The remote device may be configured to store and execute software instruction, e.g. an application for viewing and/or analyzing the received data. In some embodiments, the remote device 140 may be a device located in a cloud network.

The remote device 140 receives supplement data and usage data from the transceiver 138. The remote device 140 is configured to store and execute a software application, e.g. computer-executable software instructions, stored in a tangible, non-transient computer-readable medium, for registering the beverage apparatus receiving unit 130, which enables the remote device 140 to interact with the smart beverage apparatus 100, e.g., to receive the supplement data.

For example, the smart beverage apparatus 100 may be associated with a unique identification number, stored in storage unit 168. The unique identification number may be input by a user when the user registers the smart beverage apparatus into the software application, through a user interface which may be executed by the remote device 140. The unique identification number enables the remote device 140 to operationally connect to the smart beverage apparatus 100 (via the transceiver 138) in order to receive data such as supplement data and usage data from the smart beverage apparatus 100. The transceiver 138 may transmit using Wi-Fi, Bluetooth, near field communication, and/or a combination thereof. In some cases, the supplement data provides the user information regarding an optimal beverage to be used for mixing with the supplement in order to obtain an optimal mixture of the supplements with the beverage 104.

The beverage apparatus receiving unit 130 comprises a power source 136, which provides power to electrical components of the beverage apparatus receiving unit 130, for example, providing power to the scanning unit 132, the processor 134, the display unit 115, the beverage apparatus storage unit 168 and to the transceiver 138. The power source 136 may be a rechargeable power source, e.g. a rechargeable battery. A charging port 167 may be operationally connected to power source 136, in order to enable the recharging of power source 136. Recharging the power source 136 may be performed by connecting charging port 167 to an external power source, e.g. a battery, an electronic device, a solar recharging device, an electrical outlet, etc. The beverage apparatus receiving unit 130 enables the user of the smart beverage apparatus 100 to monitor and personalize the user's supplements levels in order to reach his desired nutrition combination.

Figure 2A:
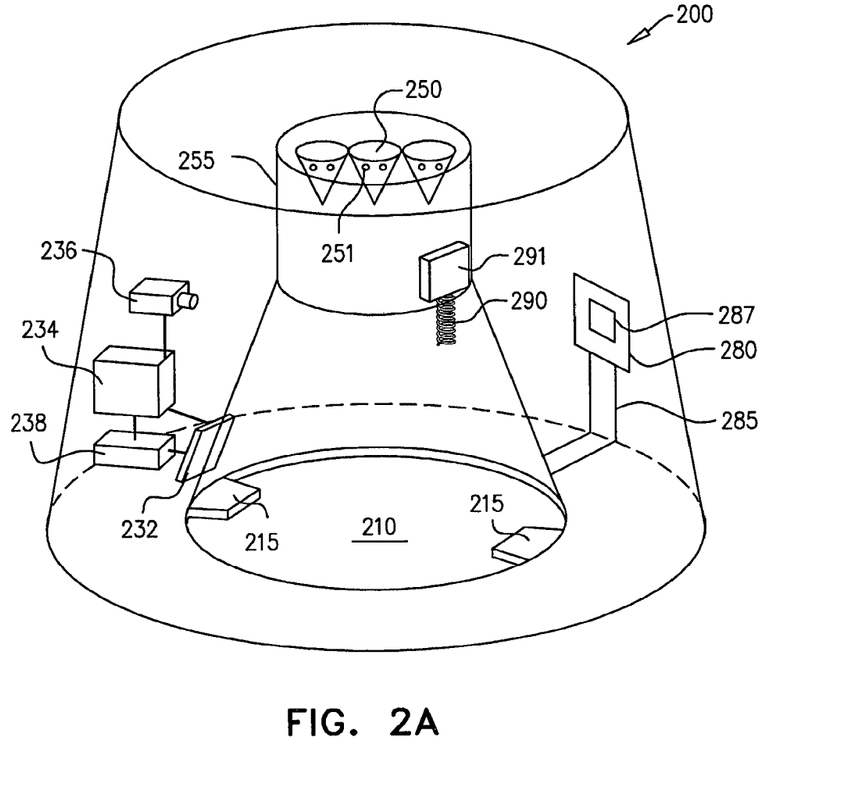
FIG. 2A shows a schematic illustration of a supplement vessel, according to some exemplary embodiments of the subject matter.

FIG. 2A shows a beverage apparatus receiving unit 200 (which may be, for example, beverage apparatus receiving unit 130 of FIG. 1), according to some exemplary embodiments of the subject matter. The beverage apparatus receiving unit 200 comprises a supplement vessel port 210 (e.g. vessel port 150 of FIG. 1) into which a supplement vessel 160 of FIG. 1 is inserted. The supplement vessel 160 contains content, such as supplements, which mix with the beverage 104 of FIG. 1 of the smart beverage apparatus 100 of FIG. 1. The supplement vessel 160 is inserted into the supplement vessel port 210 and pushed or locked into the supplement vessel port 210.

The supplement vessel 160 is pushed such that a discharge mechanism, such as spring 290 engages a locking mechanism 291 to lock the supplement vessel 160 into the supplement vessel port 210. To remove the supplement vessel 160 from the supplement vessel port 210 the supplement vessel 160 may be pushed to move the spring 290 a second time. The spring 290 engages the locking mechanism to release the supplement vessel 160. The supplement vessel 160 may be locked into the supplement vessel port 210 by handles 215, which latch onto the supplement vessel 160 after engaging the locking mechanism 291. The smart beverage apparatus 100 may be rotated, which engages one or more discharge mechanism 250 to puncture a supplement vessel seal (not shown). The discharge mechanism 250 puncture the supplement vessel seal to enable release of the content of the supplement vessel 160 into the tank 102 of FIG. 1. In some exemplary embodiment of the subject matter, the one or more discharge mechanism 250 retract after puncturing the supplement vessel 160, to enable the supplements to mix into the beverage 104.

The beverage apparatus receiving unit 200 comprises a supplement receiving port 255, which is a conduit through which the beverage 104 and the supplements mix, and which allows the supplements to dissolve in the beverage 104. In some non-limiting cases, a discharge mechanism 250 comprises at least one opening 251, through which the supplements of the supplement vessel 160 flow into the supplement receiving port 255 in order to be mixed with the beverage in tank 102.

In some non-limiting embodiments of the subject matter, the supplement vessel 160 is sealed with vacuum to remove air from the supplement vessel 160 prior to sealing it, or with a pressure differential prior to sealing it, which causes the supplement vessel 160 volume to have a different pressure from pressure in the tank 102. When the supplement vessel seal is punctured, the pressure differential causes supplements in the supplement vessel 160 to be pushed out and mixed with the beverage 104. The pressure differential forces the supplements out of the supplement vessel 160 into the supplement receiving port 255 at a force that causes mixing of the supplements into the beverage 104 for optimal solubility of the supplements in the beverage 104.

In some cases, the supplement vessel 160 useable with the beverage apparatus receiving unit 130 does not comprise a pressure differential to force the supplements out of the supplement vessel 160 when the supplement vessel 160 is punctured. In such cases, the beverage apparatus receiving unit 200 comprises a gas tank 280, which provides the pressure differential to activated the supplement vessel that forces the supplements out of the supplement vessel 160 into the supplement receiving port 255 at a force that causes mixing of the supplements into the beverage 104 for optimal solubility of the supplements in the beverage 104.

The beverage apparatus receiving unit 200 comprises a piston button 287, which activates the pressure release from the gas tank 280 to force out the supplements out of the supplement vessel 160. The gas tank 280 comprises a conduit 285, which connects the gas tank 280 to the supplement vessel 160 to enable creating the pressure differential. After the smart beverage apparatus 100 is rotated and the discharge mechanism 250 (e.g. one or more puncturing needles) causes the supplement vessel 160 to open or puncture, the user engages the piston button 287 to activate the gas tank 280. The gas tank 280 creates the pressure differential required to force the supplements out of the supplement vessel 160 through the at least one opening 251 created by the one or more discharge mechanism 250.

The beverage apparatus receiving unit 200 comprises a scanning unit 232 (e.g. scanning unit 132 of FIG. 1), which scans the vessel data storage unit 165 of FIG. 1 when the supplement vessel 160 is locked into the supplement vessel port 210 with the handles 215. The scanning unit 232, for example, an RF (Radio Frequency) reader, NFC reader, QR reader, or the like, obtains supplement data from the vessel data storage unit 165. The scanning unit 232 transfers the scanning data to a processor 234.

A processor 234 transfers the supplemental data to the display unit 115 of FIG. 1. The processor 234 may transfer the data to a transceiver 238, which transmits the supplement data to the remote device 140 of FIG. 1 such as a smartphone, tablet, laptop, or the like. The beverage apparatus receiving unit 200 comprises a power source 236, which provides power to the components of the beverage apparatus receiving unit 200, e.g. the scanning unit 232, the processor 234 and the transceiver 238.

Figure 2B:
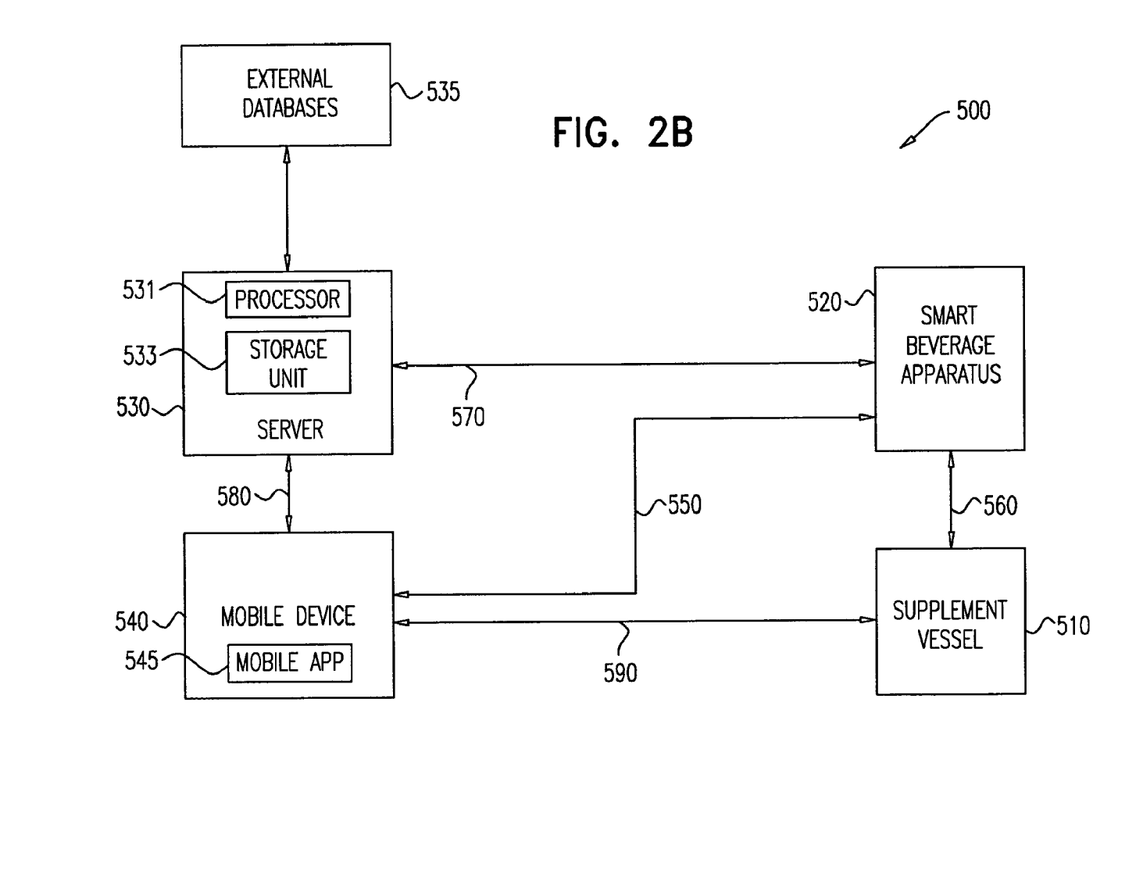
FIG. 2B schematically presents a system for consumption monitoring and consumption management of beverages consumed using the smart beverage apparatus, according to embodiments of the subject matter.

FIG. 2B schematically presents a system for consumption management of beverages consumed using the smart beverage apparatus 100, according to embodiments of the subject matter.

The consumption management system 500 may include one or more beverage apparatuses 520 for example a smart beverage apparatus 100, one or more supplement vessels 510, one or more mobile devices 540 and/or one or more servers 530.

Server 530 may be or may include for example a computerized apparatus, a processing device (e.g. a cloud computing device), a mobile device, etc.

The mobile device 540 may be for example a smartphone, tablet, mobile phone, etc. which may run mobile applications, such as a consumption monitoring application, a mobile health application, a sports activity application, such as MapMyRun (http://www.mapmyrun.com/app/iphone/) provided by MapMyFitness, Inc., Apple Watch (http://www.apple.com/watch/) provided by Apple Inc., Polar Flow (https://flow.polar.com/) provided by © Polar Electro 2015, etc.

Data communication may be activated between the server 530, the smart beverage apparatus 520, the remote device (e.g. the server 530 or the mobile device 540) and the supplement vessel 510, according to embodiments of the subject matter. The communication may be two-way communication, and may be implemented via a wired and/or wireless network. For example, wireless data communication channel 570 may enable data communication between the server 530 and the smart beverage apparatus 520. Wireless data communication channel 580 may enable communication between the server 530 and the mobile device 540. Similarly, wireless data communication channel 590 may enable communication between the mobile device 540 and the supplement vessel 510, and wireless data communication channel 550 may enable communication between the mobile device 540 and the smart beverage apparatus 520. The wireless communication channels may be implemented via cellular communication protocols, Bluetooth, Wi-Fi, etc.

Mobile device 540 may be configured to execute a mobile application 545 that may enable, for example, user registration, and may be periodically or continuously synchronized with user profile data stored in server 530.

An indication of the supplement vessel 160 insertion into the smart beverage apparatus 100 may be obtained by the scanning unit 132, and may transmitted to the remote device 140 via communication channel 550 or to the server 530 (of FIG. 2B) via communication channel 570.

External databases 535 may include, or may be operationally connected to, various data sources, to obtain information related to a user's activities, habits, nutrition, plan, etc. External databases 535 may include, for example, data obtained from sports training applications (for example, My Run) to provide training session results, data obtained from online health tests e.g. blood tests, connection with data provided by e.g. a dietitian, a sport instructor, a health advisor etc., online research data, online statistics of health tests results, e.g. after intense sport activity. The data sources may be connected to the external databases 535 and/or to server 530 via wired communication, via the internet, or via wireless communication protocols such as Wi-Fi, Bluetooth and the like. Data obtained from external databases 530 may be continuously or periodically updated, e.g. once a day, once a week, etc.

In some embodiments, external database 535 may be synchronized with various data sources such as sport monitoring applications and devices and may update user profile data stored in the server storage unit 533. For example, the user profile data may be combined and updated according to data uploaded to the external databases 535, and transmitted to a remote computing device or mobile device 540 (for example, a personal computer, smartphone or multimedia device) or to a server 530 over one or more computer networks.

Storage unit 533 of server 530 stores consumption and monitoring data, such as usage data, sensed data, user profile data and instruction data. User profile data may be stored in a server storage unit 533 and/or on another remote device e.g. the user's mobile device. The profile data may be obtained from various sources. For example, profile data may be initially received from a user upon registration of the user via the mobile application 545 of FIG. 2B.

Processor 531 performs analysis such as updating user profile data when receiving updated data from various source. For example when a user's weight changes, the user may update the profile data himself, for example via a mobile application interface, or the weight value may be updated in an external database which may be operationally connected via a network to the server 530. The updated profile data may be updated with current weight in order to update the consumption plan.

Figure 3:
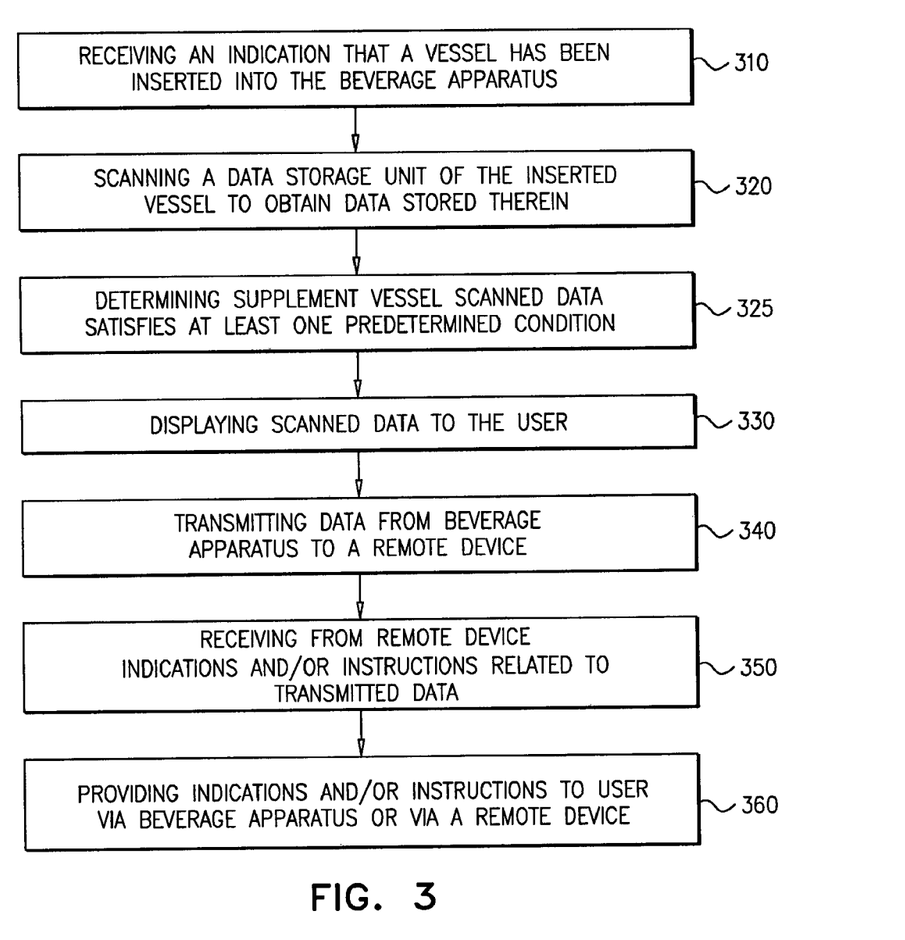
FIG. 3 is a flow chart of a method for providing consumption indications and/or instructions to user, according to embodiments of the subject matter.

FIG. 3 is a flow chart of a method for providing consumption indications and/or instructions to user, according to embodiments of the subject matter.

In operation 310, the beverage apparatus receiving unit 130 of FIG. 1 may receive an indication that a supplement vessel 160 has been inserted into the beverage apparatus receiving unit 130. In some embodiments the indication may be received via the scanning unit 132. In another embodiment the indication may be received by an insert detector (not shown). The display unit 115 may indicate to the user that the supplement vessel 160 was inserted, for example by displaying a visual and/or audible notification such as: "SUPPLEMENT VESSEL INSERTED". When the supplement vessel 160 was inserted incorrectly, for example, the locking mechanism 291 of FIG. 2 was not properly activated, the display unit 115 may indicate "SUPPLEMENT VESSEL INCORRECTLY INSERTED".

In operation 320, a scanning unit (e.g. scanning unit 132 of beverage apparatus receiving unit 130) may scan the vessel data storage unit 165 of the supplement vessel 160 which is inserted into the beverage apparatus receiving unit 130. In some embodiments supplement data related to the contents of the supplement vessel 160 and/or recommended consumption thereof is stored on the vessel data storage unit 165.

In operation 325, supplement data stored on the vessel data storage unit 165 which was scanned by the scanning unit 132 may be analyzed, e.g. compared with usage data or user profile data or other data stored on the beverage apparatus storage unit 168 and/or on the remote device 140.

The smart beverage apparatus 100 (e.g. by processor 134) may perform an analysis to determine whether scanned data of the supplement vessel 160 satisfies at least one predetermined condition. For example, a predetermined condition may include determining whether scanned data which relates to the ingredients of the supplement vessel 160, matches the user's health needs based on the user profile data. In one example, a predetermined condition may include determining whether the inserted vessel contains a specific ingredient or food which is harmful to the user due to an allergy or sensitivity. In another example, a predetermined condition may include checking whether the supplement vessel 160 contains special ingredients defined by the user, for example dairy ingredients, vegetarian ingredients, etc. In another example, a predetermined condition may include checking a user's physical activity schedule or consumption plan, a user's blood and/or DNA tests, an expiry date of the supplement vessel 160, an amount of beverage to be prepared using the inserted vessel, etc.

In some embodiments the beverage apparatus storage unit 168 may provide an instruction to the smart beverage apparatus 100 to prohibit preparation of the beverage, e.g. by rejecting the supplement vessel 160 or automatically ejecting the supplement vessel 160 if the supplement vessel 160 is hazardous or inappropriate for the user.

In operation 330, the smart beverage apparatus 100 may display to the user obtained data, e.g. it may indicate the time elapsed since the last consumption of beverage, using e.g. the display unit 115 of the smart beverage apparatus 100 and/or the remote device 140. In some embodiments, the display unit 115, may display the data received by the scanning unit 132 to the user on a display unit 115 after the scanning. The display unit 115 may be e.g. a screen, a touch screen or the like. The display unit 115 may display, e.g. the smart beverage apparatus 100 registered user's name, the ingredients of the inserted supplement vessel, the date of expiry, the current time and date, a notice that the supplement vessel inserted is original or appropriate and not forged, the maximum volume of beverage the smart beverage apparatus 100 may contain, details of the user's last usage of the smart beverage apparatus 100, etc. In some embodiments the display unit 115 may display instructions or notifications for the user, related to preferred consumption of the beverage prepared using the supplement vessel 160.

In some embodiments, e.g. if at least one predetermined condition is satisfied, e.g. the expiration date of the supplement vessel content has passed, or the amount of beverage to be prepared using the vessel is larger than the beverage apparatus receiving unit 130 volume, processor 134 may generate an indication to be displayed on display unit 115, e.g. "INAPPROPRIATE CAPSULE" or "SUPPLEMENT IS NOT SAFE FOR USE". The user may be required to indicate that the indication or warning has been read, for example, by receiving a specific input (e.g. "PREPARE BEVERAGE USING INAPPROPRIATE CAPSULE?"). The user may determine to terminate the beverage preparation by providing a negative indication, or the user may determine to continue preparing the beverage for consumption by providing a positive indication via the user interface 113 of the beverage apparatus receiving unit 130.

In operation 340, the smart beverage apparatus 100 may transmit data, e.g. usage data, supplement data, apparatus-related data or other data stored in beverage apparatus storage unit 168, to a remote device, e.g. mobile device 540 and/or server 530 of FIG. 2B. For example, the smart beverage apparatus 100 may transmit a timestamp of the insertion of the supplement vessel, the type of supplement or ingredients thereof, scanned supplement data from the supplement vessel 160, the results of the determination operation 325 whether the scanned data of vessel data storage unit 165 satisfies at least one predetermined condition, a unique identifier or ID code of the smart beverage apparatus 100, sensed data from the spout sensor 103, a manner of consumption, time of consumption, duration of consumption, a user's name or identifier, etc.

In some embodiments, the usage data may include additional data for example, if the user inserted an incorrect, inappropriate or expired supplement vessel 160, and received a notification that the supplement vessel 160 does not match the user's recommendations or user profile data, the user may decide to consume the beverage. Data indicating the mismatch and the consumption of the supplement vessel 160 may be transmitted to the remote device 140. The remote device 140 may be, e.g. a server or a mobile device. The data may be transmitted from the smart beverage apparatus 100 to the remote device 140 by various communication technologies, e.g. Wi-Fi, Bluetooth, near field communication, cellular network, etc.

In operation 350, the smart beverage apparatus 100 may receive indications and/or instructions related to the transmitted data, from a remote device, e.g. remote device 140 of FIG. 1, server 530 and/or the mobile device 540 of FIG. 2B. The indications and/or instructions may be provided based on reference data such as external databases, online databases, and on the user profile data. The indications and/or instructions may include e.g. nutrition instructions based on online reference data, a user's lifestyle and physical wellness, a user's sports activity schedule, a user's health status based on data obtained from a user's healthcare program (e.g. doctor's instructions which may be accessible to the remote device 140 or may be stored along with the user profile data, blood test results, etc.).

In some embodiments, indications or reports regarding users' vitamin and mineral deficiencies may be generated based on various external databases and/or remote applications, e.g. Vitastiq (http://www.vitastiq.com/) provided by Vitastiq Inc. which may determine whether vitamin and mineral levels of the user are too low, too high or just right or an application provided by Theranos, Inc. (https://www-.theranos.com/) which allows instant access to tracking personal health. User profile data may include values such as blood pressure, temperature and average or maximal pulse rate. These values may be provided by connectivity of the server 530 to an external mobile application such as Health-Kit (https://support.apple.com/en-us/HT203037) provided by Apple Inc., which is designed to help users keep track of their personal health and fitness data, or iHealth (https://itunes.apple.com/us/app/ihealth-myvitals/id566815525?mt=8) provided by iHealth Lab Inc. assists users' blood pressure management.

User profile data may include information obtained from other external sources, e.g. wearable or mobile activity trackers or fitness trackers such as Garmin®, Vivoactive, or Apple® watch. User profile data may be updated with information obtained from fitness applications and/or health monitoring mobile applications.

In some embodiments, the indications and/or instructions may include a customized consumption plan generated for the user, or a portion thereof. For example, separate instructions for consumption of supplements and/or beverages before, during and/or after a sport activity, or during periods of rest from sports activity, or between the supplement consumptions. The user may be instructed to take a different supplement (e.g. using a different supplement vessel) in accordance with the customized consumption plan. In one example, a single supplement vessel may be consumed 30 minutes before the sport activity, two supplement vessels may be consumed during the sport activity with a gap of e.g. an hour in between or after 500 calories were burned, and an additional supplement vessel may be scheduled for consumption during a recovery period, e.g. 1 hour after the sport activity was completed. The indications may include for example a recommendation not to consume a supplement vessel 160 which was originally scheduled to be consumed prior to a sports activity, in light of blood test results that were transmitted to the remote device 140. In some embodiments, blood test results may be obtained from an external database which may be operationally connected to server 530 of FIG. 2B, and transferred to user's remote device 140 within e.g. a day. In some embodiments, the indications may include specific instructions provided by the user's sport instructor or healthcare advisor e.g. a doctor, dietician, etc.

In operation 360, the smart beverage apparatus 100 may provide (e.g. display or sound) one or more indications and/or instructions received in operation 350. For example, and indication may be displayed to user via the smart beverage apparatus 100 on display unit 115 and/or via the remote device 140.

Figure 4:
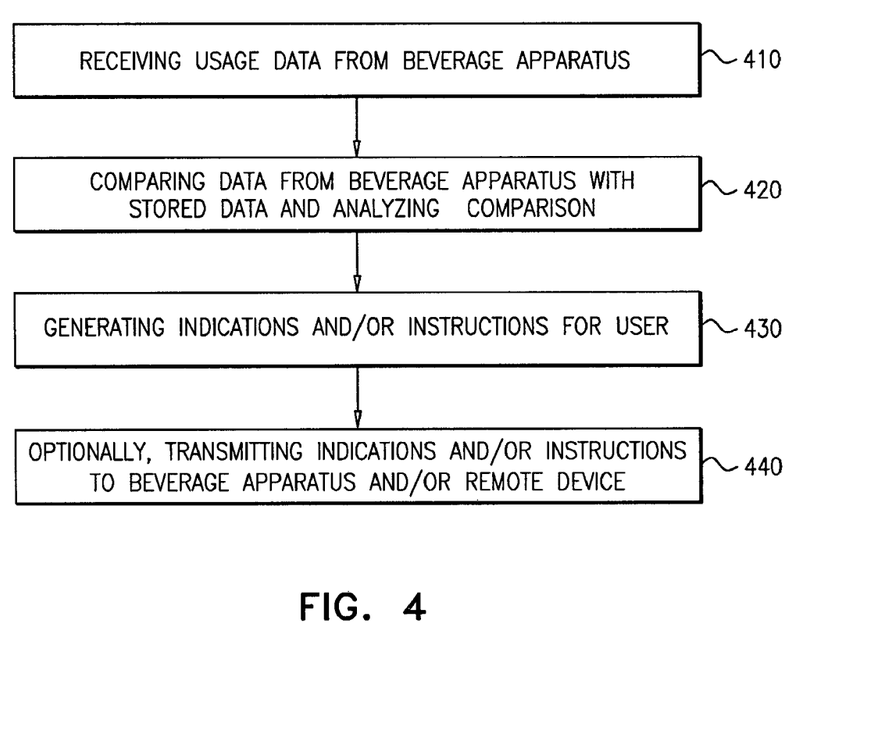
FIG. 4 is a flow chart of a method for managing and monitoring consumption data of a user using the smart beverage apparatus, according to embodiments of the subject matter.

FIG. 4 is a flow chart of a method for managing and monitoring consumption data of a user using the smart beverage apparatus 100, according to embodiments of the subject matter.

In operation 410, the server (e.g. server 530 of FIG. 2B) may receive usage data from the smart beverage apparatus 100 and/or from a remote device 140 e.g. the user's mobile device. The usage data received may be stored at a server's storage unit (e.g. storage 533). The usage data may include a user's usage history of consumption, e.g. time and date of consumption of supplements, amount consumed, etc. Usage data may further include data relating to incorrect consumption or inappropriate consumption of supplements, e.g. which were consumed by the user although not recommended, the beverage recommended for the best consumption results (hot water, orange juice or other liquids), etc.

The user profile data may be continuously updated, e.g. when new information is inserted by the user (for example if the user lost weight), and the updated information is loaded to the user profile stored in server 530. The user profile data may include e.g. the user's name, identification number, social security number, nutrition and health information related to the user, a user's biometric information (weight, height, age, gender, blood test rates, etc.), preferred sports activities performed regularly by the user, the user's eating habits, sensitivities and/or allergies to nutritional ingredients, personal genetic analysis (DNA) for example by using http://www.dnalife.eu/#!dnalife-tests/c24 gm.

Usage data stored in the server's storage unit 533 may be continuously updated using data obtained from the smart beverage apparatus 100, e.g. the type and contents of consumed beverage and time of consumption. Usage data stored in the server's storage unit 533 may be continuously updated using sensed data obtained from the spout sensor 103, e.g. indicating the amount of beverage consumed. The usage data may be used to generate a report for the user, including information related to the user's consumption.

In some embodiments, the user may receive an indication that an additional blood test is required, due to pulse rates that where obtained during a sport activity of the user. In yet another example, notifications and reminders may include an indication of an appropriate sports activity for the user relating to the user's performance, disease risk and/or health status. In yet another embodiment, the usage data collected from different users may enable generating statistics and reports related to nutritional supplement consumption and sports activities. Such data may be used, for example, for creating derivative products for institutions such as insurance companies. For example, improvement of blood test results of a user in correspondence with physical activity may influence insurance companies' requirements for blood tests results.

In some embodiments, usage data may be updated and stored in server 530 after the supplement vessel 160 is scanned by the scanning unit 132. The usage data transmitted from the beverage apparatus 100 may include, for example, a date and time of inserting the supplement vessel 160, contents of the supplement vessel, and additional data such as the results of the determination whether a predetermined condition is satisfied as performed in operation 325 of FIG. 3. The usage data received and stored in server 530 may include e.g. the data scanned from the vessel data storage unit 165 and/or data stored on the beverage apparatus storage unit 168, and/or data related to the event of the supplement vessel 160 insertion into the beverage apparatus 100.

A consumption plan which includes instruction data may be generated based on the user profile data, the usage data and additional sources such as external databases 535, available online research data, test results, etc.

In some embodiments, if relevant data is uploaded to an external database 535, a user profile data may be updated accordingly. For example if the blood test results indicate that a user is prohibited to consume high sugar rates, the user profile data may be updated accordingly.

In some embodiments, the usage data may be transmitted through a wired or wireless connection. Usage data may be automatically synchronized or uploaded to the remote device 540 or server 530 for further storage and analysis. The server 530 may generate a customized consumption plan for a user, e.g. a program that includes instructions and/or indications of recommended or optimal consumption for the user based on the user profile data, the usage data and stored data from the storage unit 533 or data obtained from the remote device 140. In some embodiments, when important information had been derived while generating the customized consumption plan, a disease risk report or a health score report may be displayed to the user via remote device 140.

In operation 420, the server 530 and/or the remote device 540 e.g. a mobile device, may analyze and conduct computations based on usage data received from the smart beverage apparatus 100, and stored data which may include user profile data, previous customized consumption plan, etc.

The user instruction data may include previous instruction data and/or updated instruction and/or indications which are analyzed currently in order to being transmitted to the smart beverage apparatus 100 and/or to the remote device 140.

The analysis may include generating customized consumption plan, e.g. the recommended consumption quantities, the recommended consumption schedule, etc. The consumption plan may be customized and determined according to a specific user's needs, for example if the user is planning a sports activity and/or if the user suffers from a chronic disease, e.g diabetes. The customized consumption plan may include time schedule for consuming a certain type of the supplement vessel 160 per a certain time period, e.g. per day and/or per month. The customized consumption plan may include a type of beverage recommended for consumption, for example hot beverage or cold beverage, milk or water, etc.

In operation 430, the analysis may include generating indications and/or instructions relating to the generated consumption plan, e.g. by the server 530. For example, if the user is using medication which prohibits the use of a specific type of the supplement vessel 160, the server 530 may generate an indication that the user should not use the inserted supplement vessel 160 or that the inserted supplement vessel 160 should be replaced with another supplement vessel that matches the consumption plan. In another example, if the user is sensitive to at least one of the ingredients of the inserted supplement vessel 160, the server 530 may generate an indication that the user should not use the supplement vessel 160.

In some embodiments, the instructions may include indications of required data update from the user, for example if blood rates are not updated within a predetermined period, an indication to the user to update blood rate may be generated.

Figure 5:
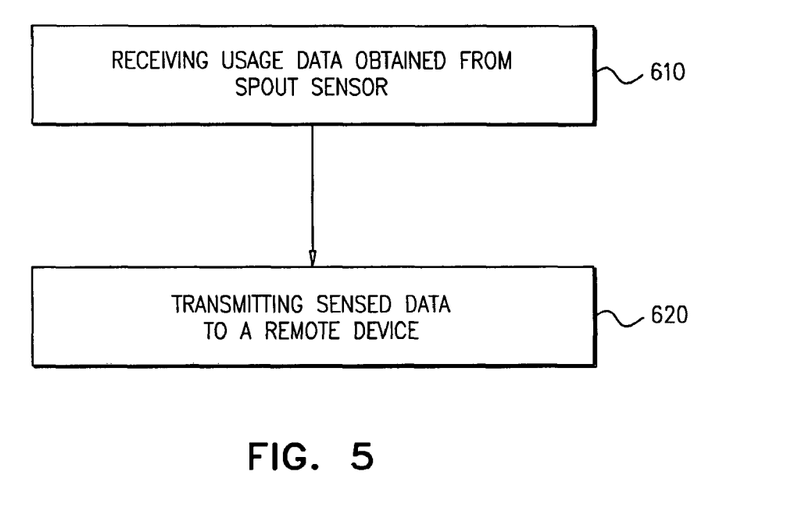
FIG. 5 is a flow chart of a method for monitoring beverage consumption by a user of the smart beverage apparatus, according to embodiments of the subject matter.

In operation 440, the server may transmit the generated indications and/or instructions to the smart beverage apparatus 100, and/or to the remote device 140. In some embodiments the server may provide an instruction to the smart beverage apparatus 100 to prohibit preparation of the beverage, e.g. by rejecting the supplement vessel 160 or automatically ejecting the supplement vessel 160 if the supplement vessel 160 is hazardous or inappropriate for the user. In some embodiments the server 530 may provide an indication before, during and/or after a sports activity, or may indicate which type of activity is recommended, the duration and the recommended intensity. FIG. 5 is a flow chart of a method for monitoring beverage consumption by a user of the smart beverage apparatus 100, according to embodiments of the subject matter.

In operation 610, the smart beverage apparatus 100 may receive usage data comprising sensed data which may be obtained by the spout sensor 103. The usage data may include, e.g. an amount of beverage in the smart beverage apparatus 100, an amount of beverage consumed or dispensed from the smart beverage apparatus 100, a duration of time since beverage was last consumed using the smart beverage apparatus 100, an amount of beverage consumed over a given time period from the smart beverage apparatus 100, an indication that a beverage has not been consumed using the smart beverage apparatus 100 over a given predetermined time period.

The data obtained by the spout sensor 103 may be stored in the beverage apparatus storage unit 168 and may be displayed to the user on the display unit 115.

In operation 620, the smart beverage apparatus 100 may transmit the usage data obtained by the spout sensor 103 to the server 530 or to a remote device 140 which may be, e.g. a mobile device.

Figure 6:
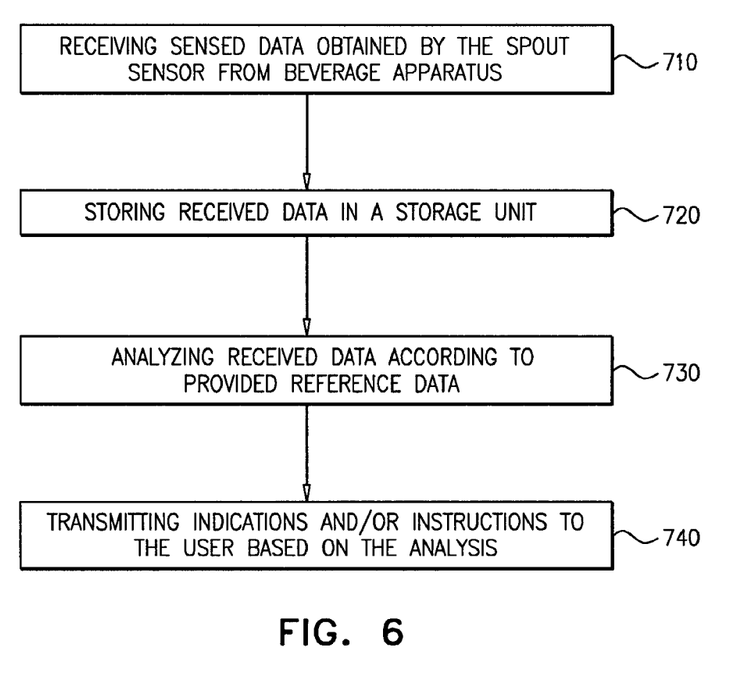
FIG. 6 is a flow chart of a method for analyzing and monitoring data obtained from a spout sensor of the smart beverage apparatus, according to embodiments of the subject matter.

FIG. 6 is a flow chart of a method for analyzing and monitoring data obtained from a spout sensor of the smart beverage apparatus 100, according to embodiments of the subject matter.

In operation 710, the server 530 and/or the remote device 140 may receive sensed data which may be obtained by the spout sensor 103 from the smart beverage apparatus 100. The sensed data may include data relating to the actual consumption (e.g. quantity and time) of a beverage using the smart beverage apparatus 100.

In operation 720, the server 530 may store the sensed data received from the smart beverage apparatus 100 in the server's storage unit 533.

In operation 730, the server 530 may analyze the received data according to provided reference data which may include, e.g. the user profile data, external database or source, remote mobile applications, etc. For example, the server 530 may determine that the user has not consumed a sufficient amount of supplement during the day.

In operation 740, the server 530 may transmit indications and/or instructions based on the server's analysis to the user using the remote device 140 and/or the display unit 115 of the smart beverage apparatus 100. For example if the analysis of operation 730 indicated that the user has not consumed a sufficient amount of supplement during the day, a reminder may be displayed on the mobile device and/or on the beverage apparatus display unit 115 regarding required consumption of a certain supplement.

The invention claimed is:

1. A method of managing and monitoring consumption data of a user using a smart beverage apparatus, the method comprising:
   receiving usage data from at least one of a smart beverage apparatus and a remote device;
   generating customized consumption plan based on the received usage data and stored data comprising user profiled data;
   generating at least one of indications and instructions relating to the generated consumption plan;
   receiving sensed data from the smart beverage apparatus, the sensed data is obtained by a spout sensor of the smart beverage apparatus and relates to an actual consumption of a beverage using the smart beverage apparatus;
   analyzing the sensed data with respect to at least one of the user profile data and external database;
   updating at least one of the indications and the instructions based on the analysis thereof; and
   transmitting at least one of the generated indications, the generated instructions, the updated indications and the updated instructions to at least one of the smart beverage apparatus and the remote device.

2. The method of claim 1, comprising generating a report comprising information related to a user's consumption and transmitting the report to at least one of the smart beverage apparatus and the remote device.

3. The method of claim 1, further comprising continuously updating at least one of the usage data and the user profile data.

4. The method of claim 1, comprising generating indications relating to required data update from the user.

5. The method of claim 1, comprising generating instructions to prohibit preparation of a beverage by the smart beverage apparatus if a supplement vessel is hazardous or inappropriate for the user.

6. The method of claim 1, comprising generating indications relating to recommended type of activity, duration and intensity thereof.

7. The method of claim 1, comprising generating a reminder that the user has not consumed a sufficient amount of a supplement during a specified period of time and transmit the reminder to at least one of the smart beverage apparatus and the remote device.

8. The method of claim 1, wherein the usage data comprises at least one of: a user's usage history of consumption, data relating to incorrect consumption or inappropriate consumption of supplements, a beverage recommended for best consumption results, a date and time of inserting a supplement vessel, contents of the supplement vessel, results of the determination whether a predetermined condition is satisfied and any combination thereof.

9. The method of claim 1, wherein the user profile data comprises at least one of: a user's name, identification number, social security number, nutrition and health information related to the user, a user's biometric information, preferred sports activities performed regularly by the user, user's eating habits, sensitivities and allergies to nutritional ingredients, personal genetic analysis (DNA), prescription medications, non-prescription medication and any combination thereof.

10. The method of claim 1, wherein the consumption plan comprises at least one of: recommended consumption quantities, recommended consumption schedule, time schedule for consuming a certain type of a supplement vessel per a certain time period, a type of beverage recommended for consumption and any combination thereof.

11. The method of claim 1, wherein the sensed data comprises at least one of: an amount of beverage in the smart beverage apparatus, an amount of beverage consumed or dispensed from the smart beverage apparatus, a duration of time since beverage was last consumed using the smart beverage apparatus, an amount of beverage consumed over a given time period from the smart beverage apparatus, an indication that a beverage has not been consumed using the smart beverage apparatus over a given predetermined time period and any combination thereof.

* * * * *